Patented July 27, 1948

2,445,794

UNITED STATES PATENT OFFICE 2,445,794

METHYL SILICONE ELASTOMERS CONTAINING Si-BONDED VINYL RADICALS

James Marsden, Schenectady, N. Y., assignor to General Electric Company, a corporation of New York No Drawing. Application June 11, 1945, Serial No. 598,912

6 Claims. (Cl. 260—46.5)

The present invention relates to methyl vinyl silicone or polysiloxane elastomers and gums. It is particularly concerned with silicone gums and elastomers containing small amounts of vinyl groups attached to silicon.

Methyl silicone elastomers and methods of preparing such elastomers are described in the copending application of Maynard C. Agens, Serial No. 526,473, and the copending application of James G. E. Wright and Curtis S. Oliver, Serial No. 526,472, both of which applications were filed March 14, 1944, and assigned to the same assignee as the present invention. Briefly described, these known silicone elastomers comprise mixtures of (1) dimethyl silicone gums obtained by treating liquid dimethyl silicones with a suitable agent such as ferric chloride or mixtures of ferric oxide and aluminum chloride, and (2) suitable fillers. The silicone gums can also be prepared by treating the liquid silicones with sulphuric acid as described in the copending application S. N. 598,913, filed concurrently herewith in the names of James Marsden and George F. Roedel and assigned to the same assignee as the present invention. The methyl-to-silicon ratio of the gums ranges from 1.98 to 2.00. They are prepared from liquid mixtures of polymeric silicones having the same methyl-to-silicon ratio, which liquid silicones are in turn obtained by hydrolysis of a pure or a substantialy pure dimethyl silane having the formula $(CH_3)_2SiX_2$, where $X$ represents a hydrolyzable group such as a halogen or alkoxy radical, containing not more than 2 mol per cent of a hydrolyzable mono-methyl silane of the formula $CH_3SiX_3$. To obtain elastomers which can be rapidly cured, for example, in a closed mold, small amounts of benzoyl peroxide or other suitable catalyst are added to the gum-filler mixture at the time the gum and filler are worked on the rubber rolls. In the cured or vulcanized state the resultant elastomers possess some of the properties of vulcanized natural rubber and are particularly characterized by their flexibility at low temperatures and their resistance to heat.

The present invention is based on the discovery that elastomers of improved hardness and compression set characteristics can be obtained from high molecular weight methyl polysiloxanes containing a small proportion of vinyl groups in place of some of the methyl radicals wherein the ratio of the sum of the methyl and vinyl group per silicon atom is from 1.95 to 2.00, preferably from 1.98 to 2.00.

The elastomers of the present invention can be prepared for example, from gums obtained by polymerizing the cohydrolysis products of a mixture of (1) a pure dimethyl-substituted silane of the type hereinbefore described containing up to 2 mol per cent of a monomethyl-substituted silane having three hydrolyzable (X) groups connected to silicon, and (2) not more than about 2.0 mol per cent, preferably from about 0.18 to 1.0 mol per cent of a methylvinyl-substituted silane or a divinyl-substituted silane containing two silicon-bonded hydrolyzable (X) groups. They can also be prepared from the products of copolymerization of a mixture of a dimethyl polysiloxane and a divinyl polysiloxane or a methylvinyl polysiloxane having the unit structure, $$(CH_3)(CH_2=CH)SiO—$$

in such proportions as to obtain products of the same vinyl content as those obtained from the above-mentioned cohydrolysis process. Such copolymerization may be accomplished by means of sulphuric acid or ferric chloride in the manner hereinbefore described. Elastomers within the scope of the present invention can also be obtained by substituting a methyl vinyl or divinyl silane for part of the dimethyl silane component, or a monovinyl silane such as vinyltrichlorosilane 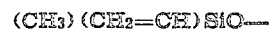 for all or part of the monomethyl silane component, of the mixtures of hydrolyzable mono-, di-, and tri-methyl silanes employed in the preparation of the elastomers described and claimed in the copending application S. N. 598,914 filed concurrently herewith in the names of Robert H. Krieble and John R. Elliott and assigned to the same assignee as the present invention.

The vinyl silanes employed in the practice of the present invention may be prepared from suitable ethyl silicon halides by introducing chlorine into the ethyl radical or radicals thereof and subsequently subjecting the chlorinated product to dehydrochlorination to form the corresponding vinyl-substituted silane. For example by this process vinyltrichlorosilane is prepared from ethyltrichlorosilane and vinylmethyldichlorosilane from ethylmethyldichlorosilane. The chlorination of the ethyl radical can be accomplished by the use of sulfuryl chloride while the dehydrochlorination of the resultant chloroethyl groups can be carried out, for example, by heating the chloroethyl derivatives with an excess of quinoline or other suitable tertiary amine.

The above-mentioned products will ordinarily be in the form of, or can be converted to, a gum which is then used in the preparation of an elastomer. Elastomers can also be prepared from high viscosity liquid silicones. As will be described more fully hereinafter, such elastomers, which may be formed in situ on a fabric or fibrous backing to give a "rubberized" cloth, are prepared from high viscosity liquid silicones which have a viscosity of at least about 1000 centistokes at room temperature and in which not more than 5.0 per cent of the silicon atoms are connected to a vinyl group.

From the above description it will be noted that the high molecular weight liquid products and gums of the present invention are essentially composed of dimethyl silicon units,

and a few vinyl silicon units which may be monovinyl silicon units,

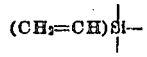

divinyl silicon units,

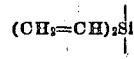

or methyl vinyl silicon units,

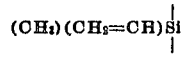

In some cases, trimethyl silicon units, $(CH_3)_3Si—$, or monomethyl silicon units,

or both will also be present. It is to be understood of course that each of the unsatisfied valences in these unit structures are attached to the oxygen atoms which link the various units together to make up the polymeric methyl vinyl silicone or polysiloxane. The polysiloxane or silicone components of all of the elastomeric products of the present invention are also characterized by the fact that they contain both methyl-substituted and vinyl-substituted silicon atoms with from 0.18 to 5 per cent of the silicon atoms being connected to at least one vinyl radical.

Except for the introduction of the vinyl silicon units into the molecules of the liquid silicones and gums from which the elastomers are prepared, the catalysts, treating agents, etc., and usually the processes, employed in the preparation of the elastomers of the present invention are the same as those employed in the preparation of the elastomers described and claimed in the above-mentioned copending applications. For example, when the liquid silicones are converted to gums, this may be accomplished by suitable treatment thereof with ferric chloride, sulphuric acid, etc. The resultant gums, preferably after first being washed to remove most or all of the catalyst, are then compounded with suitable fillers, curing catalysts and the like and thereafter cured to bring out more fully the elastomeric properties.

The data given in Table I shows the marked improvement in the hardness and compression set characteristics obtained by introducing vinyl groups into methyl silicone gums employed in the preparation of elastomers. The gums employed in the preparation of the elastomers whose characteristics are set forth in Table I were all prepared by adding the weight per cent of the vinyl chlorosilane given in the second column to a dimethyldichlorosilane containing 0.15 mol per cent methyltrichlorosilane, hydrolyzing the resultant mixture and treating the liquid silicone hydrolysis product with ferric chloride. Elastomers were then prepared by milling 100 parts of each of the resultant gums with one part lead oxide, 200 parts titanium oxide, and two parts of benzoyl peroxide, after which the milled products were pressed and vulcanized in a steam heated press at 150° C. for 10 minutes, and then further cured at 200° C. in an air circulated oven for the times indicated in the table. The lead oxide was employed for the purpose of neutralizing any residual ferric chloride present in the gum. Elastomers containing lead oxide as an essential ingredient are described and claimed in copending application S. N. 459,128, filed August 11, 1944, in the names of James Marsden and George F. Roedel, now Patent No. 2,436,220, and assigned to the same assignee as this present invention.

Table I

| Elastomer | Vinylchlorosilane | Cure, Hrs./°C. | Hardness | Per Cent Comp. Set | Per Cent Elong. | Tensile p. s. i. |
|---|---|---|---|---|---|---|
| A | None (Control Sample) | 2/100 | 38 | 81.5 | 168 | 572 |
|   |   | 4/200 | 32 | 92.0 | 172 | 595 |
|   |   | 12/200 | 33 | 76.7 |   |   |
|   |   | 24/200 | 37 | 66.6 | 164 | 602 |
|   |   | 72/200 | 43 | 49.2 | 188 | 720 |
| B | 0.2% Methylvinyldichlorosilane | 2/100 | 42 | 51.6 | 146 | 580 |
|   |   | 4/200 | 42 | 55.6 |   |   |
|   |   | 12/200 | 45 | 49.0 | 126 | 635 |
|   |   | 24/200 | 48 | 39.5 | 146 | 620 |
|   |   | 72/200 | 55 | 26.6 | 120 | 720 |
| C | 0.5% Methylvinyldichlorosilane | 2/100 | 70 | 42.6 | 135 | 680 |
|   |   | 4/200 | 70 | 36.3 | 60 | 800 |
|   |   | 12/200 | 72 | 32.0 | 56 | 720 |
|   |   | 24/200 | 72 | 28.0 | 68 | 860 |
|   |   | 72/200 | 75 | 23.1 | 54 | 815 |
| D | 1% Methylvinyldichlorosilane | 2/100 | 72 | 40.8 | 40 | 435 |
|   |   | 4/200 | 74 | 26.0 | 44 | 595 |
|   |   | 12/200 | 75 | 25.2 |   |   |
|   |   | 24/200 | 76 | 24.0 | 30 | 470 |
|   |   | 72/200 | 81 |   | 46 | 760 |
| E | 1% Divinyldichlorosilane | 2/100 | 76 | 30.3 | 68 | 705 |
|   |   | 4/200 | 77 | 25.5 | 46 | 672 |
|   |   | 12/200 | 79 | 24.8 |   |   |
|   |   | 24/200 |   |   | 46 | 825 |
|   |   | 72/200 | 82 | 23.0 | 44 | 680 |

The hardness was measured by means of a Shore type "A" durometer. The per cent compression set was determined following a modification of the A. S. T. M. D-395-40T revised method "B." Molded plugs of the elastomers were compressed to 70 per cent of their original thickness between steel plates, heated while under compression at a temperature of 150 degrees C. for 6 hours, and then allowed to cool. The pressure was released and the thickness of the resultant plug measured one hour thereafter. The figures given in the table indicated the compression set of the plugs as a result of the treatment. A 100 per cent compression set would indicate no recovery, while a zero compression set would mean that the plug returned to its original thickness after release of the pressure.

From the results set forth in the above table it will be noted that a marked difference in hardness and compression set characteristics of the elastomers are obtained by the introduction of vinyl groups which in this case was accomplished by adding a hydrolyzable methylvinyl silane to the dimethyl silane mixture from which the gums were prepared. The improvement in this respect became more marked as the proportion of the vinyl-silicon units was increased. A particular advantage of the invention is that it makes possible the preparation of elastomers having lower compression set after molding than those made from methyl silane gums. The compression set of both types of elastomers may be reduced by curing in air at elevated temperatures. However, less time is required to reduce the compression set to a minimum value in the case of an elastomer containing vinyl groups. Because these elastomers are relatively harder and have lower compression set characteristics than the straight methyl silicone elastomers of the same formulation, they are particularly useful as gasket materials, shock absorbers and the like, especially under high temperature conditions. They may also be used as cable insulation and the like in the electrical industry. The results given in Table I indicate that when the polymers contain a relatively large amount of vinyl-substituted silicon atoms, it makes little difference whether these silicon atoms are attached to one or two vinyl groups, that is whether the source of these silicon atoms was a methyl-vinyl or divinyl silane, actually a comparison of the physical properties of elastomers C, D, and E indicates that no particular advantage is to be expected by further increasing the vinyl content of these products. While the proportions of methylvinyl silicon units or divinyl silicon units can be increased above the amounts indicated in the table, the gums best suited for the preparation of elastomers should not contain more than about 2 per cent of the silicon atoms thereof connected to a vinyl radical. Elastomers of this type are, of course, not restricted to those obtained from gums prepared by this particular process or from these particular silanes. The invention rather includes any gum of the type described in the above-mentioned copending applications. The improvements obtained by the substitution of vinyl groups for some of the silicon-bonded methyl groups has been found to be general to all of these types of elastomers, which may contain only dimethyl silicon units, both dimethyl silicon units and some monomethyl silicon units or monomethyl, dimethyl, and trimethyl silicon units. The gums will have an R/Si ratio of from about 1.98 to 2.00 where R represents both vinyl and methyl radicals and at least 0.18 per cent of the silicon atoms will be connected to a vinyl group.

It has been found also that the same degree of vulcanization or cure of the elastomers of the present invention can be obtained with relatively smaller proportions of benzoyl peroxide. In Table II are listed the properties of two rubbers having the same composition as elastomer D set forth in Table I, except that only 1 per cent and 0.5 per cent of benzoyl peroxide were respectively used in their cure.

Table II

| Elastomer | Parts of Benzoyl Peroxide | Hours Deg. C. Cure | Hardness | Per Cent Set |
| --- | --- | --- | --- | --- |
| F | 1 | 2/100 | 60 | 49.2 |
|   |   | 4/200 | 60 | 38.6 |
|   |   | 12/200 | 65 | 29.1 |
|   |   | 24/200 | 65 | 23.2 |
|   |   | 87/200 | 67 | 18.6 |
| G | 0.5% | 2/100 | 37 | 70 |
|   |   | 4/200 | 39 | 51.7 |
|   |   | 12/200 | 42 | 53.0 |
|   |   | 24/200 | 46 | 43.3 |
|   |   | 87/200 | 50 | 32.0 |

It will be noted that an equally vulcanized rubber from the point of view of low compression set was obtained by use of one per cent peroxide as compared with double this amount for sample D of Table I.

Alternatively these silicone elastomers can be prepared from high viscosity liquid methylvinyl polysiloxanes having a viscosity of 1000 centistokes or more and containing up to 5 per cent, or more, preferably about 2 to 5 per cent of silicon atoms attached to at least one vinyl group. I have found that sulphuric acid within the preferred range of concentrations referred to in the above-mentioned copending application of James Marsden and George F. Roedel can be efficaciously employed for the preparation of the desired high molecular weight siloxane polymers containing vinyl groups without reducing the vinyl content thereof. In this connection, the absence of any substantial polymerization of the vinyl group by sulphuric acid can best be illustrated by specific tests on a methylvinylsilicone having the unit structure [(CH₃)(CH₂=CH)SiO]. The unsaturation of an oily methylvinylsilicone prepared by hydrolysis of a substantially pure methylvinyldichlorosilane corresponded to a molecular weight of 91.2 per double bond. This oil, after polymerization to a very viscous liquid by shaking with 25.6N sulphuric acid for 2 hours, had an unsaturation corresponding to 89.4 per double bond. It is obvious that no unsaturation was lost during polymerization and indeed the determined values compare favorably with the calculated molecular weight of 86.1 per double bond for methylvinylsilicone.

The following example illustrates the preparation of such an elastomer from a viscous liquid silicone. An oil was prepared by cohydrolyzing dimethyldichlorosilane, 5 mol per cent methylvinyldichlorosilane and about 0.12 mol per cent monomethyltrichlorosilane. This oil was further polymerized by shaking it with an equal weight of 20.05N sulphuric acid for 2 hours at room temperature. The polymerization was then stopped by washing the oil to remove the sulphuric acid. The washed product had a viscosity of 1129 centistokes at 100° F. 100 parts of the viscous oil was mixed with 200 parts of titanium dioxide and various amounts of benzoyl peroxide were milled into portions of this mixture. The resulting compounds were molded at 150° C. for 10 minutes and subsequently cured at 200° C. The physical properties are given in the table below:

Table III

| Sample No. | Benzoyl Peroxide Parts by Weight | Cure | Shore Hardness | Tensile p. s. i. | Per Cent Elong. |
|---|---|---|---|---|---|
| H | 1.0 | As pressed / 18 hrs. at 200 deg. C | 5 / 60-70 | | |
| I | 2.0 | As pressed | 70 | 460 | 20 |

High viscosity liquid methyl vinyl polysiloxanes suitable for the preparation of elastomers can also be obtained by polymerization of a polysiloxane system containing monomethyl-, dimethyl-, and trimethyl-substituted silicon atoms as well as vinyl-substituted silicon atoms.

The foregoing type of elastomers are adapted for the usual elastomer applications and also for application to a fabric or other fibrous sheet material to produce a "rubberized" cloth. For example, the uncured or partially curved mixture of oil, filler and catalyst can be applied to a fibrous sheet material by means of rollers or doctor blades, and subsequently cured in situ by subjecting the coated sheet to elevated temperatures.

What I claim as new and desire to secure by Letters Patent of the United States is:

1. A solid elastomer comprising a solid, elastic, curable, hydrocarbon-substituted polysiloxane consisting of silicon and oxygen atoms, and methyl-substituted and vinyl-substituted silicon atoms, wherein the average ratio of the sum of the methyl and vinyl groups per silicon atom is from 1.95 to 2.00, and from 0.18 to 2.0 per cent of the silicon atoms are connected to at least one vinyl group.

2. An elastomeric composition comprising a solid, elastic, curable, methyl- and vinyl-substituted polysiloxane consisting of silicon and oxygen atoms, and methyl-substituted and vinyl-substituted silicon atoms, wherein the average ratio of the sum of the methyl and vinyl groups per silicon atom is from 1.98 to 2.00, and from 0.18 to 2.0 per cent of the silicon atoms are connected to at least one vinyl group.

3. A solid elastomer comprising (1) a filler and (2) a solid, elastic, curable, hydrocarbon-substituted polysiloxane consisting of silicon and oxygen atoms, and methyl-substituted and vinyl-substituted silicon atoms, wherein the average ratio of the sum of the methyl and vinyl groups per silicon atom is from 1.98 to 2.00, and from 0.18 to 2.0 per cent of the silicon atoms are connected to at least one and not more than two vinyl groups.

4. A solid elastomer comprising (1) a filler and (2) a solid, elastic, curable, hydrocarbon-substituted polysiloxane consisting of silicon and oxygen atoms, monomethyl-, dimethyl-, and methyl vinyl-substituted silicon atoms, wherein the average ratio of the sum of the methyl and vinyl groups per silicon atom is from 1.98 to 2.00, and from 0.18 to 2.0 per cent of the silicon atoms are attached to one methyl group and one vinyl group.

5. A composition of matter capable of being heat-cured to a solid, elastic mass and comprising (1) a filler, (2) a high viscosity liquid methyl vinyl polysiloxane consisting of silicon and oxygen atoms, and methyl-substituted and vinyl-substituted silicon atoms, wherein the average ratio of the sum of the methyl and vinyl groups per silicon atom is from 1.98 to 2.00, and from 0.18 to 2.0 per cent of the silicon atoms are connected to at least one and not more than two vinyl groups, and (3) a small amount of benzoyl peroxide.

6. The heat-cured elastomeric product of claim 5.

JAMES MARSDEN.

REFERENCES CITED

The following references are of record in the file of this patent:

UNITED STATES PATENTS

| Number | Name | Date |
|---|---|---|
| 2,420,912 | Hurd | May 20, 1947 |